(12) United States Patent
Anstey et al.

(10) Patent No.: US 6,279,304 B1
(45) Date of Patent: Aug. 28, 2001

(54) CROP PICK-UP HAVING CROP LIFTERS INCORPORATED IN CENTERING AUGER

(75) Inventors: Henry Dennis Anstey; Manfred Engel, both of Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/436,329

(22) Filed: Nov. 8, 1999

(51) Int. Cl.$^7$ .................................................. A01F 15/07
(52) U.S. Cl. ................................................ 56/341; 198/676
(58) Field of Search ....................... 56/341, 343; 100/88; 198/657, 670, 676

(56) References Cited

U.S. PATENT DOCUMENTS 4,187,030 * 2/1980 Godley .
5,356,054 * 10/1994 Loppoli et al. .
5,398,432 * 3/1995 Vohl .
5,848,523 12/1998 Engel et al. .

\* cited by examiner

Primary Examiner—H. Shackelford

(57) ABSTRACT

A large round baler includes a crop pick-up assembly which is wider than the baling chamber and equipped with right- and left-hand stub augers for centering the crop for delivery through the inlet of the baling chamber. In order to prevent the augers from compressing crop against crop feeding tines located between the inner ends of the stub augers, crop lifters are mounted to inner end portions of each of the stub augers. The stub augers are each double flight augers with the flights being offset 180° from each other. The crop lifters each include first and second lifter plates respectively associated with the first and second flights, the lifter plates each having a first end fixed to the auger core and being curved outwardly from the core to the outer periphery of the associated flight.

15 Claims, 5 Drawing Sheets

CROP PICK-UP HAVING CROP LIFTERS INCORPORATED IN CENTERING AUGER

BACKGROUND OF THE INVENTION

The present invention relates to crop pick-ups and more specifically relates to such pick-ups which include stub augers at its opposite sides for narrowing the flow of crop lifted by the pick-up tine reel.

In a known crop pickup which is used to lift windrowed crop into the baling chamber of a baler, the pick-up is wider than the width of the baling chamber. In order to narrow the windrow of crop to the width of the baling chamber, right- and left-hand stub augers are mounted at the opposite sides of the pick-up in co-axial relationship to feeder teeth located in the center region between the stub augers, the augers operating to converge the crop toward the center of the baler some distance past the inside edge of the opposite walls of the baling chamber. A tooth stripper assembly is mounted in the region between the stub augers for stripping crop from the feeder teeth. The augers normally feed material near the outside diameter of the flighting, so that the transition of material to the outside diameter of the rotating tines is usually quite an easy one. If however, the crop flow is interrupted, as when a bale doesn't start to turn, for example, the auger will be rotating past crop which is not moving into the bale chamber. If the crop begins to accumulate between the flights of the auger, crop will become wedged as the flighting pushes the crop against the feeder teeth stripper assembly. This wedging can result in the pick-up becoming plugged and/or in damage to the pick-up. Furthermore, when the pick-up becomes plugged, the operator is forced to expend time and effort to remove the crop material so as to unplug the pick-up.

SUMMARY OF THE INVENTION

According to the present invention, there is provided an improved pick-up structure and more particularly there is provided an improvement to a pick-up structure of the type embodying crop converging or centering stub augers.

A broad object of the invention is to provide a pick-up incorporating centering augers with an improved feed structure for reducing the tendency of the crop material to become wedged against obstructions such as the tooth stripper assembly located adjacent the respective inner ends of the stub augers.

A more specific object of the invention is to provide a pick-up, as defined in the immediately preceding object, wherein a crop lifter assembly is fixed to the auger core and leading face of the flighting of the inner portion of each of the augers.

These and other objects of the invention will become apparent from a reading of the ensuing description together with the appended drawings.

DESCRIPTION OF THE PREFERRED EMBODIMENT

Figure 1:
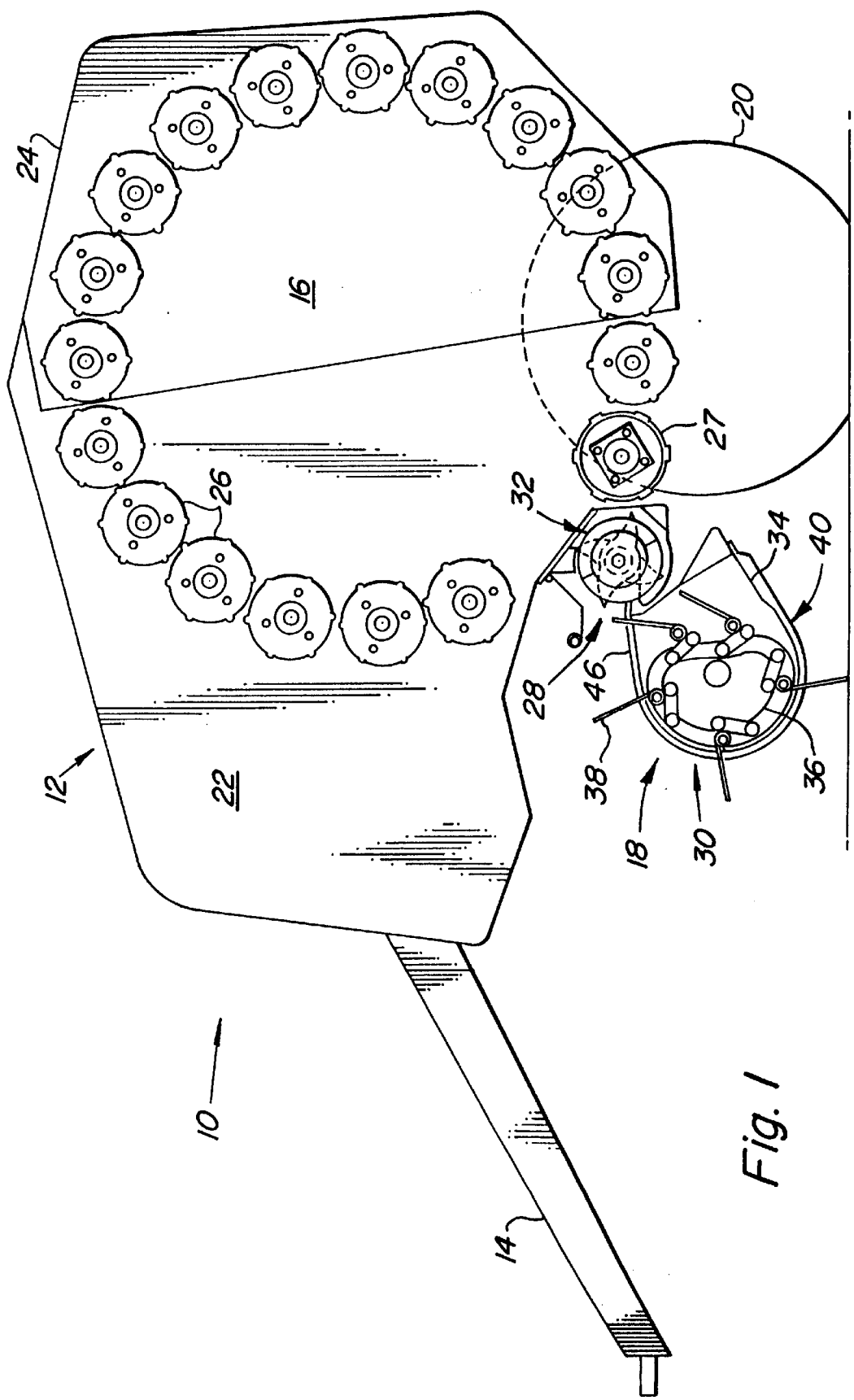
FIG. 1 is a somewhat schematic left side elevational view of a baler equipped with a pick-up of the type with which the present invention is particularly adapted for use.

Referring now to FIG. 1, there is shown a baler 10 for making large cylindrical bales. The baler 10 includes a chassis 12 from which extends a draft tongue 14 adapted for being connected to a towing vehicle, such as an agricultural tractor, not shown. The chassis 12 supports bale-forming elements, described below, which define a fixed volume baling chamber 16 into which crop is fed by means of a crop feed arrangement 18 as the baler is towed along on its support wheels 20. The chassis 12 includes a front section 22 to the upper rear portion of which is pivotally mounted a discharge gate 24 which may be swung vertically, from its shown lowered closed position, to permit a formed bale to fall onto the ground, as is well known in the art. The baling chamber 16 is defined by a plurality of identical rolls 26 arranged generally in a circular pattern and by respective side walls of the front section 22 and discharge gate 24. Also arranged in this circular pattern is a slightly larger roll 27 which delimits the rear of a crop inlet 28. While the chamber thus defined is fixed in size, the present invention could also be used with a variable chamber baler, with the roll 27 being a floor roll or being of a configuration serving as a lower front bale-forming belt support roll. In any event, the chamber 16 includes an inlet 28 through which crop may be conveyed by the crop feed arrangement 18.

Figure 2:
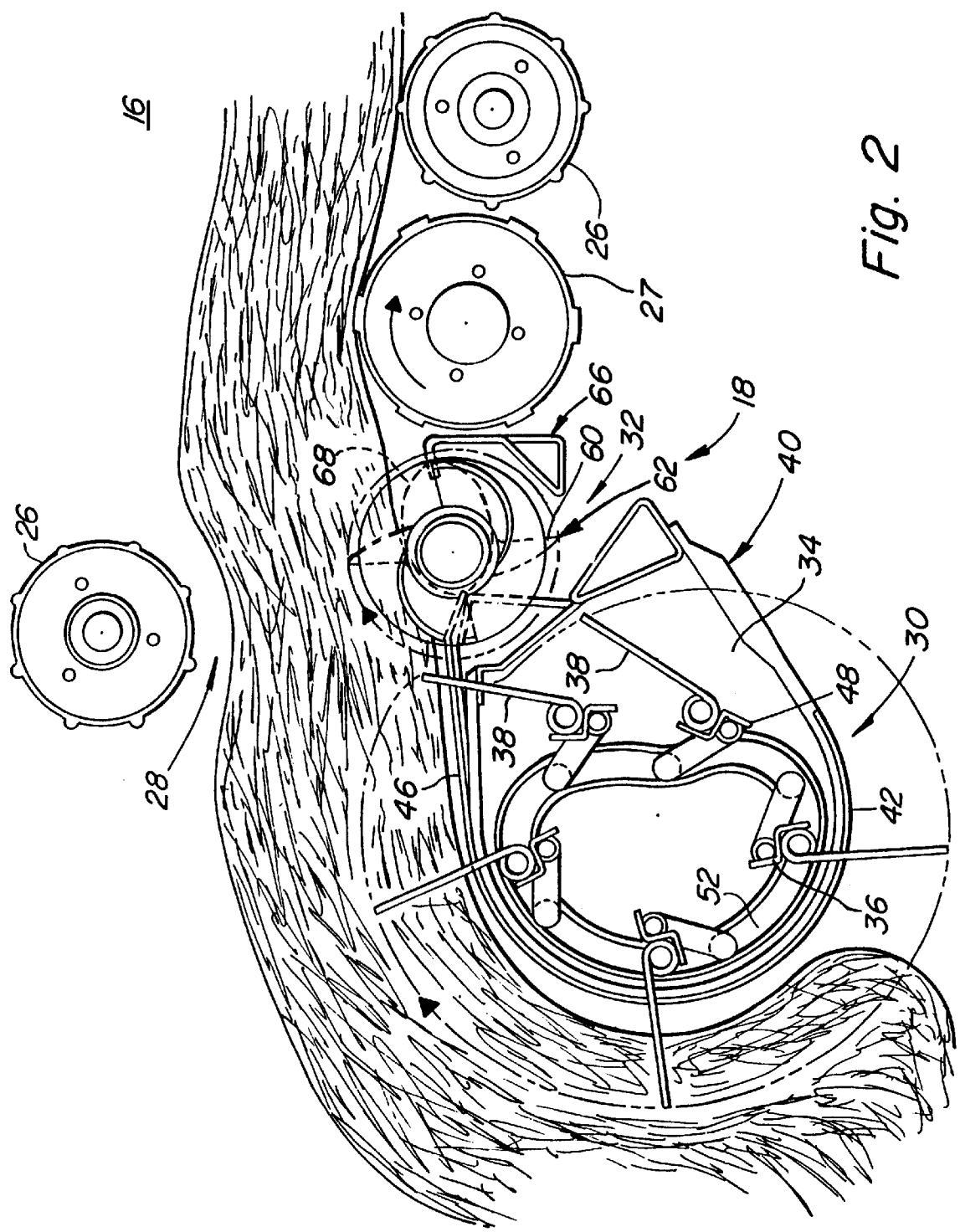
FIG. 2 is a schematic right side elevational view showing the flow of windrowed crop as it is being conveyed from the ground to the bale chamber.
Figure 3:
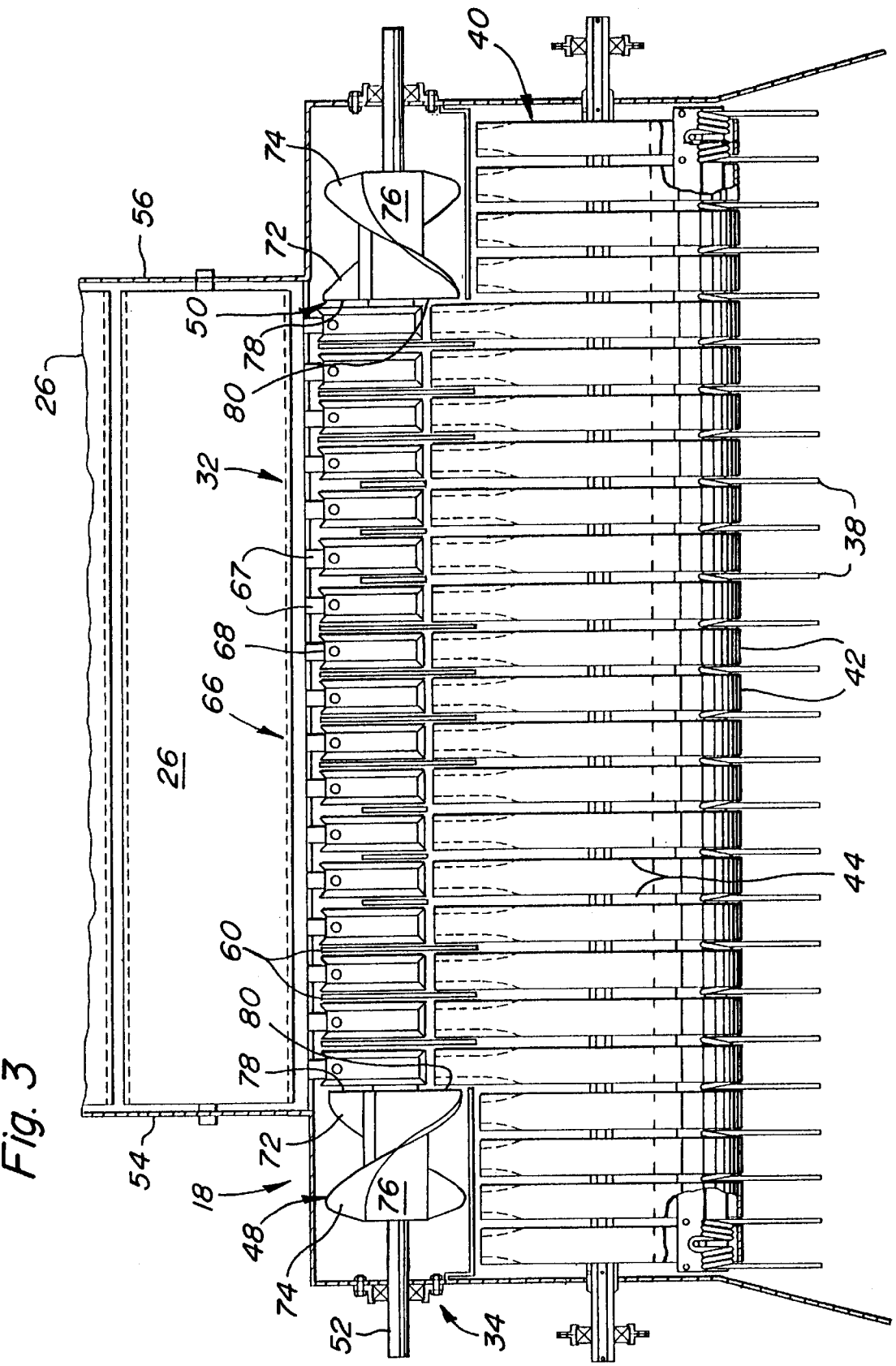
FIG. 3 is a schematic top view, with some parts in section, of the crop feed arrangement and entrance to the baling chamber.
Figure 4:
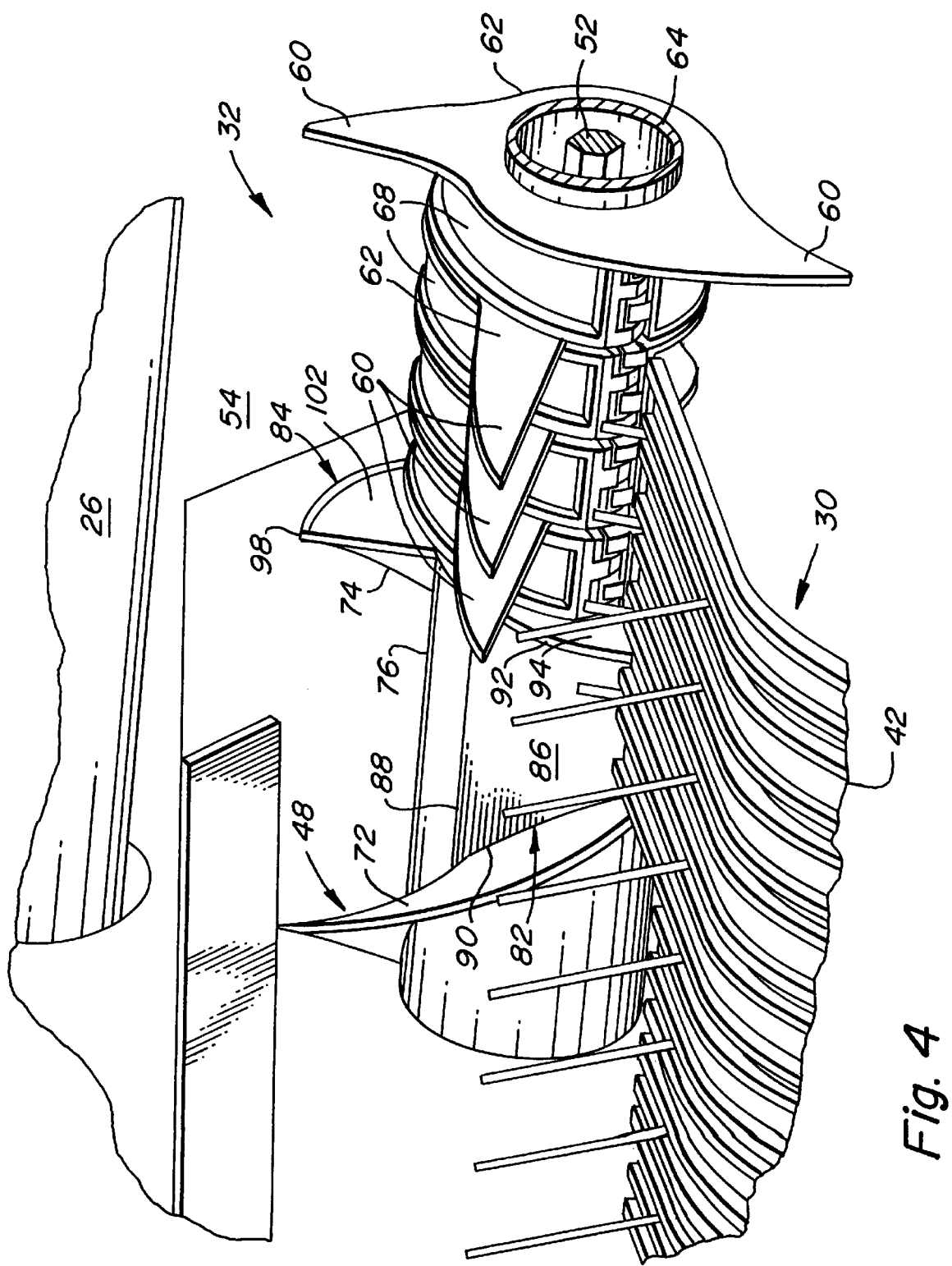
FIG. 4 is a perspective view looking rearwardly toward the right-hand side of the pickup portion containing the right-hand stub auger with the associated crop lifter assembly and some of the feeder tines.

Referring now also to FIGS. 2–4, it can be seen that the crop feed arrangement 18 has a width greater than that of the baling chamber 16. The crop feed arrangement 18 is composed of a crop collecting pick-up 30 and a rotary conveyor 32. The pick-up 30 is of a conventional design including a frame 34 supported from the main frame 12. The pick-up 30 includes a tined reel structure 36 having five sets of spring wire tines 38 arranged angularly about a horizontal transverse axis of rotation of the reel structure 36, with individual tines 38 of each set being grouped in coplanar sets spaced transversely across the pick-up. A u-shaped tine stripper assembly 40 opens rearwardly and extends about the reel structure 36 with the stripper assembly 40 comprising individual bands 42 spaced transversely from each other to define a plurality of slots 44 through which the respective co-planar sets of tines 38 pass during operation, it being noted that crop slides along a top surface 46 defined by the bands 42 to the point where the crop is engaged by the rotary conveyor 32.

The rotary conveyor 32 includes right- and left-hand stub augers 48 and 50, respectively, having tubular cores fixed for rotation with a hexagonal drive shaft 52 (FIG. 4) extending axially through the auger cores. The stub augers 48 and 50 have respective inner ends that terminate inwardly of right- and left-hand side walls 54 and 56 (FIG. 3) of the chassis front end section 22 respectively forming opposite side wall portions of the baling chamber 16. In the disclosed embodiment, the distance that the augers extend inwardly from the walls is about 95 mm. Located between the inner ends of the stub augers 48 and 50 and arranged concentrically about the drive shaft 52 is a further portion of the rotary conveyor 32 here shown in the form of a plurality of rigid crop feeding fingers or teeth 60, with coplanar pairs of the teeth 60 being formed at diametrically opposite locations of a respective plate 62, and with the plates 62 being spaced from each other along and welded to a support tube 64 having end plates (not shown) that are fixed for rotation with the drive shaft 52. Associated with the teeth 60 is a stripper arrangement 66 (FIG. 2) including a stripper support 67 extending transversely behind a plurality of strippers 68 respectively arranged in fore-and-aft alignment with the strippers 44. Each stripper 68 is molded of a plastic material and is made in upper and lower halves having interlocking forward ends defining a hinge permitting the halves to be separated. The upper and lower halves of each stripper 68 contain respective semi-cylindrical recesses which together form a cylindrical opening, located just to the rear of the forward end of the stripper, which is disposed loosely about the support tube 64 between adjacent ones of the plates 62 such that the forward end of the stripper 68 is loosely supported on the tube 64. The rear ends of the upper and lower halves of each stripper 68 cooperate to define a rectangular opening in which is received a mounting tab (not shown) of the support 67. A mounting bolt, not shown, extends through aligned holes provided in the stripper halves and the tab so as to clamp the stripper to the support 67. A curved upper surface 70 of each of the strippers 68 is so located relative to the path of rotation of the teeth 60 that the surface 70 engages crop carried by the adjacent teeth 60 so as to gradually lift it off the teeth.

The present invention relates to right- and left-hand crop lifter assemblies that are respectively secured to inner end portions of the augers 48 and 50. Specifically, the augers 48 and 50 are of a so-called double pitch construction including first and second spiral flights 72 and 74, respectively, welded along the circumference of a cylindrical auger core 76 and having respective inner terminal ends 78 and 80 which extend radially from diametrically opposite locations of the core 76.

Figure 5:
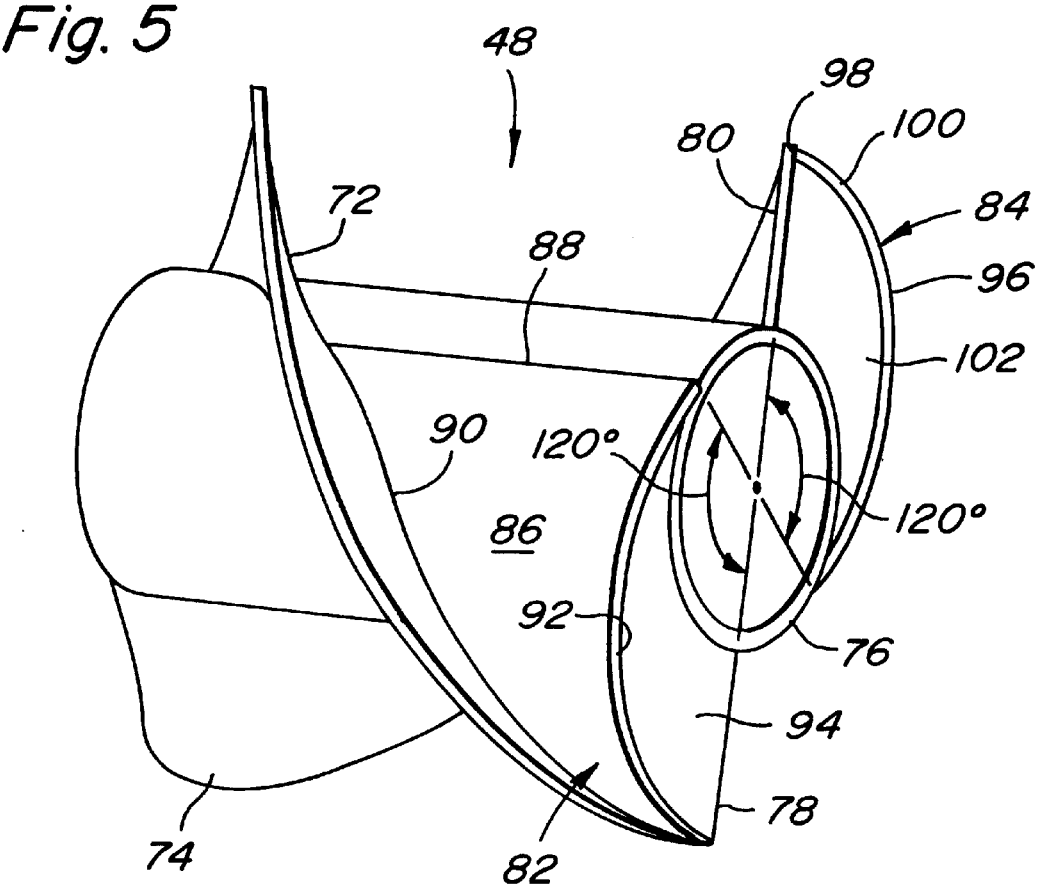
FIG. 5 is a perspective view of the right-hand stub auger and crop lifter assembly.

With reference to the right-hand auger 48 shown in FIGS. 4 and 5, it can be seen that the crop lifter assembly for the auger 48 includes first and second crop lifters 82 and 84, respectively, associated with an inner end section of the core 76 and with the respective end sections of the flights 72 and 74 that are fixed to core inner end section.

Specifically, the crop lifter 82 includes a spiral shaped lifter plate or scroll 86 having a radially inner end 88 extending parallel to the axis of, and being welded to the tube 76. The lifter plate 86 includes a first edge 90 welded along a leading face of the inner end section of the spiral flight 72 and includes a second edge 92 which is substantially coplanar with an inner end of the auger core 76. The edges 90 and 92 thus converge toward each other and meet at a point at a location at the outer periphery of the end of the flight 72, this location being spaced approximately 120° about the axis of the core 76 from the edge 88. A substantially vertical filler plate 94 closes the space between the edge 92 and the core 76.

Similarly, the crop lifter 84 includes a spiral shaped lifter plate or scroll 96 having an inner end (not shown) welded along the auger core 76 at a location approximately diametrically opposite from the edge 88 of the lifter plate 86, the lifter plate 96 having a first edge 98 welded along a leading face of the auger flight 74 and having a second edge 100 disposed substantially coplanar with the inner end of the auger core 76, with the first and second edges 98 and 100 converging and meeting at the outer periphery of the inner end of the auger flight 74. A substantially vertical filler plate 102 fills the gap between the auger core 76 and the lifter plate 96.

The auger 48, as viewed looking toward its inner end as shown in FIGS. 4 and 5, rotates clockwise so that the edge 88 of the lifter plate 86 and the similar edge of the lifter plate 96 lead the remaining portions of the plates so that engaged crop, either that being augered inwardly or that being fed rearwardly by the pick-up 30, is gradually lifted to the outer perimeter of the auger flights 72 and 74, and thus, to the outer perimeter of the rotary tines 60. The length and curvature of the lifter plates 86 and 96 is such that it is easier for the crop to be lifted away from the auger core 76 and flighting than for it to be augered or pinched between the flighting and the stripper arrangement 66 or tines 60. Aiding in lifting the crop is the curved upper surface 70 of the two strippers 68 that are respectively located at the inner ends of the augers 48 and 50. In addition to the action of the strippers 68, stripping of crop from the lifter plates 86 and 96 is aided by the baling chamber roll 27, due to its clockwise rotation, as indicated by the arrow in FIG. 2, and its close proximity to the outside diameter of the augers 48 and 50. Specifically, good stripping action has been found to occur if the space between the outside diameter of the augers 48 and 50 and the chamber roll 27 is in the neighborhood of between 5–25 mm but preferably at about 15 mm. The curvature of the lifter plates 86 and 96 may be that of a spiral, as shown, or may be constant once a certain distance from the core 76 is achieved, the most effective shape depending on crop conditions.

Figure 6:
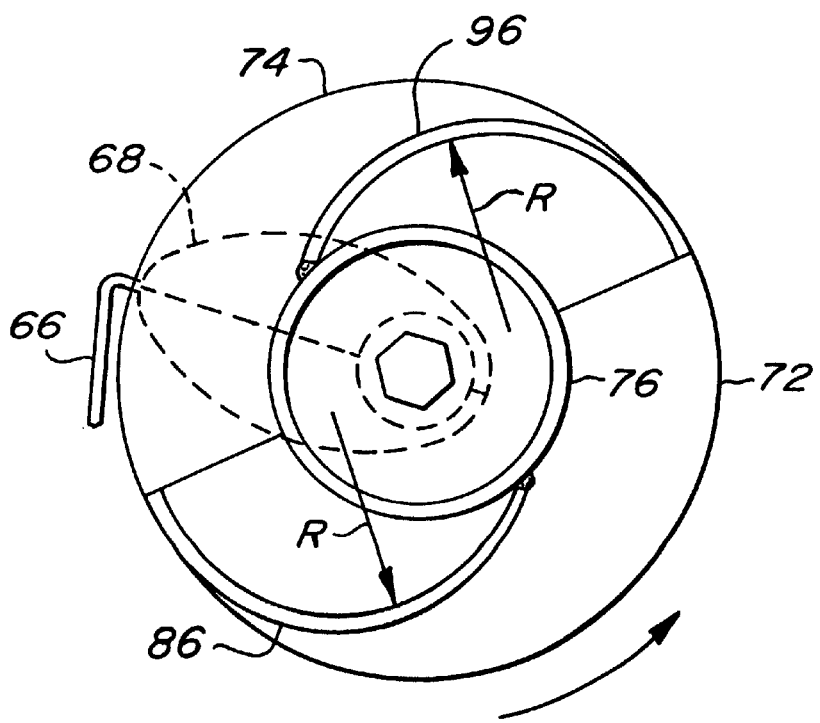
FIG. 6 is a left end view of the left auger assembly together with the adjacent crop stripper.

With reference to the left-hand auger assembly 50 shown in FIG. 6, it can be seen that the auger tube 76 has a diameter which is approximately half that of the auger. Further, it can be seen that the crop lifter plates 86 and 96 are each formed at a constant radius, with each radius having its center parallel to a line extending through the center of the tube 76 and aligned with the radially extending terminal inner ends 78 and 80 of the flights 72 and 74. This radius is approximately ⅔ the radius of the auger. While this is the preferred dimensions of the auger tube, flighting and lifter plates, other relationships would result in satisfactory operation.

What is claimed is:

1. In a large round baler including a bale-forming chamber having opposite side walls supporting bale-forming elements defining a crop inlet at a lower front location of the chamber, a crop pick-up located forwardly of said baling chamber for conveying crop rearwardly toward said inlet and having a working width greater than a distance between said side walls, and right- and left-hand stub augers located behind said pickup with each having flighting fixed to a central core and being pitched for conveying crop inwardly to a width commensurate with that of said baling chamber, the improvement comprising: a crop lifter assembly associated with axial inner end portions of said flighting of each of said right- and left-hand augers; and each crop lifter assembly including at least one lifter plate including a first end extending axially inwardly from a base location of a leading face of said flighting and being fixed to said core, with said lifter plate being curved radially outwardly from said core and terminating at an axial inner end of the associated auger.

2. The large round baler defined in claim 1 wherein said at least one lifter plate terminates at the outer diameter of said axial inner end of the associated auger.

3. The large round baler defined in claim 1 wherein said at least one lifter plate has a trailing edge fixed to a leading face of said flighting.

4. The large round baler defined in claim 3 wherein said first end of said at least one lifter plate extends parallel to a central longitudinal axis of said core.

5. The large round baler defined in claim 1 wherein said at least one filler plate has an inner edge engaging the axial inner end of the lift plate.

6. The large round baler defined in claim 1 wherein a filler plate extends between said auger core and said at least one lifter plate.

7. The large round baler defined in claim 1 wherein said flighting of each of said stub augers includes first and second flights offset approximately 180° from each other about a central axis of said core; and said crop lifter assembly including said at least one lifter plate associated with said first flight and a second lifter plate associated with said second flight.

8. The large round baler defined in claim 7 wherein said at least one and second lifter plates each extend approximately 120° about said core.

9. The large round baler defined in claim 1 wherein said baler includes crop feeding elements located between said augers and operable to sweep through a path having an upper periphery substantially in line with an upper periphery of said stub augers, whereby said at least one lifter plate associated with each auger operates to place inwardly delivered crop at a location at or above said upper periphery of the path of said crop feeding elements.

10. The large round baler defined in claim 9 wherein said stub augers are driven from a shaft extending centrally through said augers; and said crop feeding elements being in the form of tines mounted for rotation with said shaft.

11. The large round baler defined in claim 1 wherein each auger core has a diameter which is approximately half that of the auger, the flighting of each auger includes a terminal inner end located at an inner end of the core and extending radially thereto, and said lifter plate being formed with a constant radius portion, having its center on a radial line passing through the center of said core and in line with said terminal inner end of said flighting.

12. The large round baler defined in claim 11 wherein said flighting of each auger includes first and second flights offset approximately 180° from each other with said second flight having an inner terminal end located on said line, said at least one crop lifter plate having an outer edge fixed to a leading face of said first flight; a second lifter plate offset 180° from said at least one crop lifter plate and having a radially inner end fixed to said core; said second lifter plate being formed at said constant radius which also has its center on said line.

13. The large round baler defined in claim 1 wherein said bale-forming elements include a bottom element extending transversely behind and in close proximity to an outer diameter of said stub augers and including a periphery which moves upwardly and rearwardly behind said stub augers.

14. The large round baler defined in claim 13 wherein said bottom element is a roll which rotates in the same direction as do the stub augers and is spaced from the stub augers by a distance in the neighborhood of from 5–25 mm.

15. The large round baler defined in claim 13 wherein said bottom element is a roll which rotates in the same direction as do the stub augers and is spaced from the stub augers by a distance of 15 mm.

* * * * *